(12) United States Patent
Chang et al.

(10) Patent No.: US 7,170,904 B1
(45) Date of Patent: Jan. 30, 2007

(54) ADAPTIVE CELL SCHEDULING ALGORITHM FOR WIRELESS ASYNCHRONOUS TRANSFER MODE (ATM) SYSTEMS

(75) Inventors: Chih-Yuan Chang, Palo Alto, CA (US); Jenwei Liang, Cupertino, CA (US); Huei-ming Steve Yang, Redwood City, CA (US); Yee-Hsiang Chang, Cupertino, CA (US); Francis James Smith, Livermore, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 913 days.

(21) Appl. No.: 09/649,265

(22) Filed: Aug. 28, 2000

(51) Int. Cl.
- *H04Q 7/00* (2006.01)
- *H04L 12/28* (2006.01)
- *H04L 12/43* (2006.01)
- *H04L 12/413* (2006.01)

(52) U.S. Cl. .................. 370/447; 370/329; 370/461; 370/395.4; 370/468

(58) Field of Classification Search ............. 370/431, 370/432, 437, 442, 443, 444, 445, 447, 450, 370/458, 461, 462, 336, 337, 328, 329, 345–347, 370/348, 323, 335, 412, 314, 280, 281, 294, 370/395.4, 395.41, 395.42, 395.21, 468; 455/12.1, 428, 430, 453, 455
See application file for complete search history.

(56) References Cited

U.S. PATENT DOCUMENTS

| | | | | |
|---|---|---|---|---|
| 5,384,777 A | * | 1/1995 | Ahmadi et al. | 370/85.2 |
| 5,499,243 A | * | 3/1996 | Hall | 370/85.8 |
| 5,668,863 A | | 9/1997 | Bieselin et al. | 379/202 |
| 5,677,909 A | * | 10/1997 | Heide | 370/347 |
| 5,892,769 A | * | 4/1999 | Lee | 370/447 |
| 5,922,045 A | | 7/1999 | Hanson | 709/206 |
| 5,970,062 A | * | 10/1999 | Bauchot | 370/345 |
| 6,199,076 B1 | | 3/2001 | Logan et al. | 707/501 |
| 6,353,617 B1 | * | 3/2002 | Cadd et al. | 370/445 |
| 6,366,761 B1 | * | 4/2002 | Montpetit | 455/12.1 |
| 6,381,228 B1 | * | 4/2002 | Prieto, Jr. et al. | 370/323 |
| 6,529,520 B1 | * | 3/2003 | Lee et al. | 370/442 |
| 6,621,803 B2 | * | 9/2003 | Halton et al. | 370/329 |
| 6,697,346 B1 | * | 2/2004 | Halton et al. | 370/335 |
| 6,785,252 B1 | * | 8/2004 | Zimmerman et al. | 370/337 |

FOREIGN PATENT DOCUMENTS

| | | |
|---|---|---|
| EP | 0 679 005 A1 | 10/1995 |
| EP | 0 856 979 A2 | 8/1998 |
| WO | WO 91/16775 A1 | 10/1991 |
| WO | WO 99/43128 A1 | 8/1999 |

OTHER PUBLICATIONS

The Magic WAND Deliverable 3D1, "Wireless ATM MAC Overall Description".

(Continued)

*Primary Examiner*—Hanh Nguyen
(74) *Attorney, Agent, or Firm*—Haverstock & Owens LLP

(57) ABSTRACT

A high speed wireless network for the access market where a scheduling algorithm adjusts the ratio of two contention modes used to allocate bandwidth from the Hub. The two contention modes, request and grant mode and contention mode, are utilized so that contention is greater when the system is lightly loaded and seamlessly decreases as the system becomes heavily loaded.

52 Claims, 2 Drawing Sheets

DOWNSTREAM SCHEDULER

OTHER PUBLICATIONS

ACTS Project AC085 Wireless ATM Network Demonstrator, The Magic WAND, Deliverable 1D5 WAND System Specification.

ACTS Project AC085 Wireless ATM Network Demonstrator, The Magic WAND, Deliverable 3D4 Wireless ATM MAC Performance Results.

ACTS Project AC085 Wireless ATM Network Demonstrator, The Magic WAND, Deliverable 3D5 Wireless ATM MAC—Final Report.

Gallager, R. G., "A Perspective on Multiaccess Channels", IEEE Transactions on Information Theory, vol. IT-31, No. 2, Mar. 1985, pp. 124-142.

* cited by examiner

ATM CUBE

MULTICAST ID

| | |
|---|---|
| 0PPP_PPPP | GROUP OF 2 (xPPP_PPPP) |
| 10PP_PPPP | GROUP OF 4 (xxPP_PPPP) |
| 110P_PPPP | GROUP OF 8 (xxxP_PPPP) |
| 1110_PPPP | GROUP OF 16 (xxxx_PPPP) |
| 1111_0PPP | GROUP OF 32 (xxxx_xPPP) |
| 1111_10PP | GROUP OF 64 (xxxx_xxPP) |
| 1111_110P | GROUP OF 128 (xxxx_xxxP) |
| 1111_1110 | GROUP OF 256 (xxxx_xxxx) |

DOWNSTREAM SCHEDULER

ADAPTIVE CELL SCHEDULING ALGORITHM FOR WIRELESS ASYNCHRONOUS TRANSFER MODE (ATM) SYSTEMS

FIELD OF THE INVENTION

This invention relates to the field of high speed wireless networks. More particularly, this invention relates to the field of integrating a scheduling algorithm to switch between contention and request and grant mode to achieve high performance in an asynchronous transfer mode (ATM) cell.

BACKGROUND OF THE INVENTION

The general structure of a high speed wireless network utilizes a central Hub and a number of End User Nodes (EUNs). The basic operating unit of the system is a cell, where the Hub is located at the center of the cell and the EUNs are distributed within the coverage range of the Hub. In the downstream direction (from the Hub to the EUNs), the communication channel is a broadcasting channel. In other words, any signal sent by the Hub is received by every EUN in the system.

In the upstream direction (from the EUNs to the Hub), each EUN transmission is a unicast heard only by the Hub. In a conventional high speed wireless network, the EUNs are not configured to receive transmissions from other EUNs. The upstream communication channel is shared by many EUNs using one of two types of access systems. A first access system is known as a time division multiple access (TDMA) based system is one in which all the EUNs transmit using the same frequency, but avoid colliding by transmitting at different times. A second access system is called a frequency division multiple access (FDMA) system is one in which each EUN has a separate frequency assignment to avoid collision when coordinating transmission. In both these access systems, the downstream signal is transmitted at a different carrier frequency than the upstream signal. However, because the upstream and downstream slots are of the same length, both channels have the same bandwidth.

As the EUNs are switched on, the Hub executes a one time ranging operation. Ranging determines the distance between each EUN and the Hub. An EUN which is far from the Hub must transmit faster than an EUN which is near to the Hub. After the ranging is complete, the EUNs are accordingly aligned by the Hub in time slots from the frame of reference of the Hub.

During any given time slot, only one EUN is allowed to transmit at a time. To coordinate EUN transmission in a given time slot, the Hub may utilize one of two main coordinating modes.

A contention mode is utilized to coordinate transmission when there is a relatively small number of EUNs in the system trying to capture the upstream bandwidth. When there is a larger number of EUNs in the system, a request and grant, or piggybacking mode is used.

In the contention mode, the Hub broadcasts which EUNs are eligible to contend for a particular time slot. Each contending EUN will then answer the broadcast if that particular EUN wishes to transmit. This mode is particularly useful when there is a relatively small amount of EUNs in the system, or when idle EUNs require a route to request grants quickly.

The request and grant, or piggybacking mode functions oppositely of the contention mode. In the piggybacking mode, each individual EUN that wishes to transmit will unicast a request for a time slot from the Hub. The Hub will then broadcast a time slot grant signal to every EUN. When this occurs, each individual EUN will receive the signal and will recognize whether it, or another EUN is receiving a time slot grant. These grants will assign EUNs to time slots based on bandwidth availability. This mode is most effective when there are a large number of EUNs transmitting continuously.

Because the number of EUNs in a wireless system can change often and sometimes change in a short period of time, a scheduling algorithm is needed to adjust the ratio between request and grant mode and contention mode. To provide a smooth transition, an algorithm which can seamlessly switch between the two coordinating slotted multiple access modes is desired.

SUMMARY OF THE INVENTION

The present invention is a method of implementing an adaptive cell scheduling algorithm in a wireless network channel shared by a plurality of users. The present invention switches between two coordinating slotted multiple access modes to coordinate user transmission.

The two coordinating slotted multiple access modes, a contention mode and a request and grant mode, are both present in the network at all times and the percentage of each of the modes are dynamically changing values whose sum is always 100%.

The present invention allocates a queue in a weighted fair queue to generate contention slots. When a collision occurs between two users, two new requests for generating contention slots are placed in the weighted fair queue. When all contention is resolved, a starting request is placed in the weighted fair queue. This method allows the weighted fair queue to adjust the rate of generating contention slots automatically. When the network is lightly loaded, the weighted fair queue increases the rate of generating contention slots, and when the network is heavily loaded, the weighted fair queue decreases the rate of generating contention slots.

DETAILED DESCRIPTION OF THE PREFERRED EMBODIMENT

Figures 1, 2:
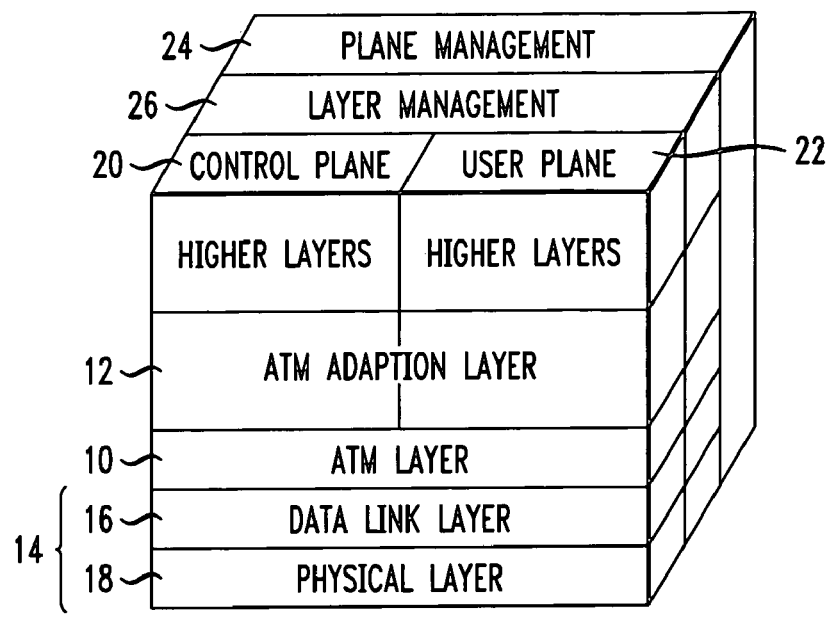
FIG. 1 illustrates an ATM cube in a stack configuration of the present invention.
FIG. 2 illustrates a Multicast ID Table of the present invention.

In the preferred embodiment of the present method, the basis for transmission of broadband information in this type of high speed wireless network is asynchronous transfer mode (ATM). An ATM Cube may be considered in terms of a traditional stack configuration as depicted in FIG. 1. More specifically, the Hub receives ATM cells from a back-haul network and delivers them in a special format to the EUNs.

In the reverse direction, an EUN receives ATM cells from its subscribers or converts legacy interfaces to ATM and delivers these ATM cells in a special format to the Hub. The Hub recovers the ATM cells from the upstream signals and delivers them to the back-haul network.

Any ATM system may be considered in terms of the traditional layered protocol stack (FIG. 1). In this framework, the ATM Layer (10) is responsible for delivery of data across multiple physical connections. The ATM Adaption Layers (AALs)(12) and applications operate above the ATM Layer (10). Below the Network Layer, the ATM specification refers to a Physical Layer (PHY) (18). An ATM's PHY (18) consists of the Transmission Convergence (TC) Sub-Layer (14) and the Physical Medium (PM). In terms of the traditional stack model, the TC is the Data Link Layer (DLL)(16) and the PHY (18) combined. In the traditional stack model, the DLL (16) is typically broken down into two sub-layers, a Logical Link Control (LLC), which interfaces to the network, and a MAC which interfaces to the PHY (18).

Referring again to FIG. 1, an ATM system is also divided into vertical planes, which provide similar services in all protocol layers. These planes are the control, user, and management planes. The User Plane (22) is responsible for carrying data, including control and management information, across those connections and for performing functions such as flow control. The Control Plane (20) is responsible for performing call control and connection control functions. The Management Plane (24) is responsible for resource allocation, error and fault reporting, operation and maintenance (OAM) information flows, and any parameters associated with a given layer. In addition, an overall Layer Management (26) spans all layers and is responsible for the coordination of the entire system.

The preferred embodiment of the present method assigns each physical EUN a unique 6-byte physical identification that is used during sign-on. Thereafter, it is assigned a logical EUN_ID from 1 to 254 (i.e. 0000_0001 to 1111_1110). The EUN_ID is changeable on the fly and a physical EUN may be assigned multiple EUN_IDs in order to allow it to have more than 256 Virtual Circuits (VCs). The link address is a 16 bit number, broken down into an 8 bit EUN_ID, with an 8 bit sub-address. These bits can be used to specify a null, unicast or multicast/broadcast addresses.

According to the preferred embodiment of the present invention as depicted in FIG. 2, multicast addressing is used for sending control messages and to assign contention slots. The multicast addresses use an EUN_ID of 255 (1111_1111). This form of addressing uses the 8 bit sub-addresses to specify a group of EUNs. As shown in FIG. 2, a group may consist of all EUNs down to a specific EUN.

The upstream air interface of the preferred embodiment uses TDMA. Individual upstream slots are assigned to a specific VC in a specific EUN. Contention timeslots are assigned to a group of EUNs, using the multicast addressing mode. Since there is no retry mechanism, only cell requests may be transmitted in contention slots.

Two requests are included in each upstream burst in the MAC messaging field. Each request includes an 8 bit link layer connection (VCI) address (i.e. a link address without the EUN_ID, which would be the same as that in the Link Address field), and an 8 bit length field, indicating the number of cells which are currently queued at the EUN. Because the actual length is transmitted, the effects of a lost or duplicated request are minimized.

The preferred embodiment of the invention also provides a contention mechanism to allow the EUN to notify the Hub of pending traffic. It is anticipated that the majority of the requests will be carried in normal MAC cells (piggybacking), but the contention mechanism provides a route for idle EUNs to request grants quickly. An upstream contention slot will be announced to all EUNs via a grant from the Hub using the multicast addressing mode, which indicates the group of EUNs that may contend.

Figure 3:
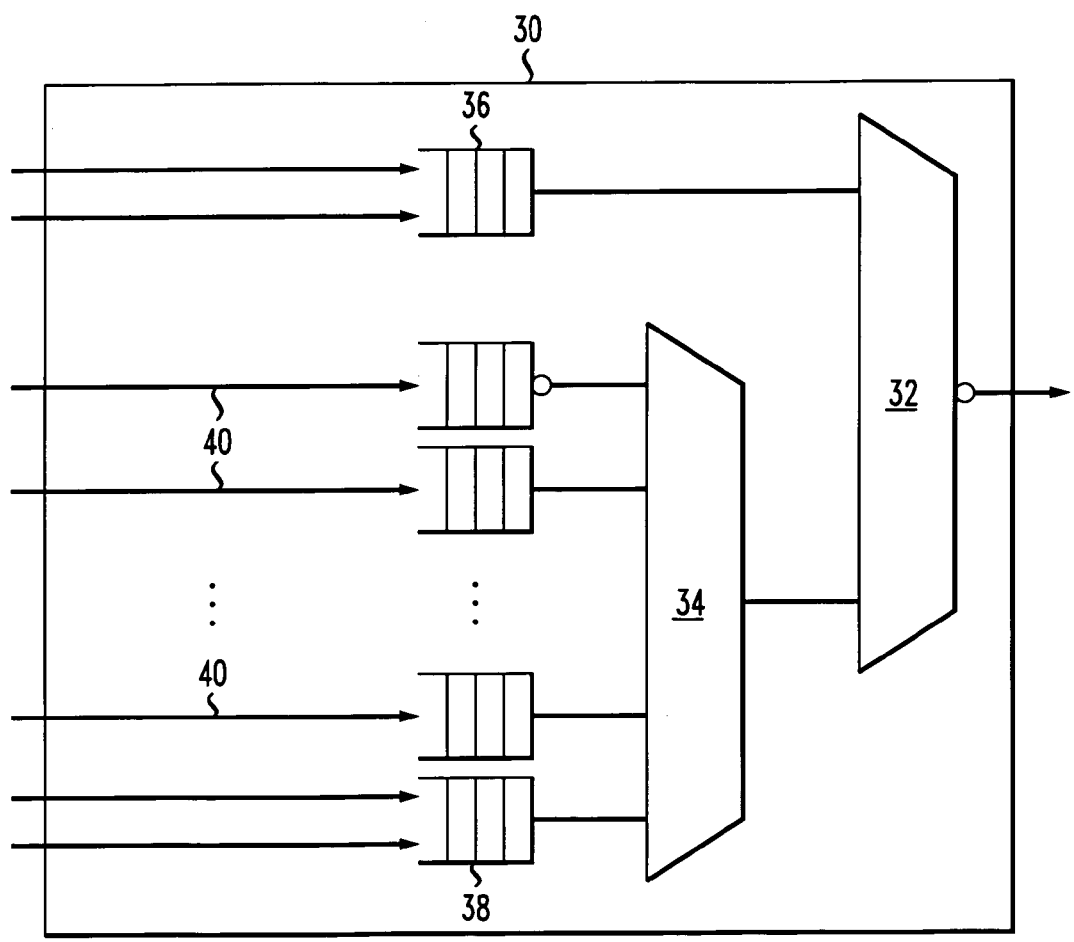
FIG. 3 illustrates the preferred Scheduling Block of the present invention.

The preferred embodiment of the present invention is depicted in FIG. 3 and is configured to seamlessly switch between request and grant mode and contention mode. A scheduling algorithm incorporated by a scheduling block (30) containing a priority queue (32), a bypass queue (36), a weighted fair queue (34) and a contention queue (38) is used to implement this algorithm. The bypass queue (36) allows real time traffic such as Constant Bit Rate (CBR) to bypass the weighted fair queue (34) and not be included in the algorithm with the contention mode and the request and grant mode. Therefore, when the bypass queue (36) is not empty, the priority queue (32) will allow the contents of the bypass queue (36) to be delivered before delivering the contents of the weighted fair queue (34).

Referring again to FIG. 3, the weighted fair queue (34) actually implements the scheduling algorithm to serve non-real-time traffic classes so different streams such as EUN requests (40) and the output from the contention queue (38) can be prioritized based on their Quality of Service (QoS). The QoS is the priority given to any given EUN based upon the monetary value paid by that EUN to use the wireless network. For instance, an EUN that pays more in QoS will have a higher priority and therefore be higher in line than an EUN that pays less. The contention queue (38), however, has a priority lower than that of any EUN input (40) requesting bandwidth from the weighted fair queue (34).

Therefore, according to the preferred embodiment of the present invention, when the network is heavily loaded and a number of EUNs are requesting bandwidth (40) from the weighted fair queue (34), the contention queue (38) will occupy a small percentage of the total requests to the weighted fair queue (34). For instance, if there are nine EUNs requesting bandwidth (40) from the weighted fair queue (34) in request and grant mode, the ratio of request and grant/contention will be 9/1 or 90% request and grant and 10% contention.

Referring again to FIG. 3 in the preferred embodiment of the present invention, as the network becomes lightly loaded, the number of EUNs requesting bandwidth (40) from the weighted fair queue (34) decreases. However, the contention queue (38) retains the one input to the weighted fair queue (34). Therefore, as the number of EUNs requesting bandwidth (40) in the request and grant mode decreases, the ratio of request and grant/contention decreases. For instance, if the number of EUNs requesting bandwidth (40) decreases to three, then the mode ratio will be 3/1 or 75% request and grant and 25% contention. In other words, the percentage of contention in the system will seamlessly increase as the number of EUN requests (40) in the system decrease.

Alternative embodiments of the present invention include variations of the scheduler block (30) such as omissions, additions or reorganizations of the priority queue (32) or the bypass queue (36). However, the organization of the weighted fair queue (34), the contention queue (38) and the EUN requests (40) will not differ from the preferred embodiment.

Other aspects of the preferred embodiment of the present invention include the MAC continuously selecting cells to transmit in the downstream direction and assign upstream slots to specific VCs at specific EUNs. The downstream direction is straightforward, being very similar to existing wireline ATM systems. A Weighted Fair Queue (WFQ) is used for data traffic while the CBR traffic is transmitted immediately on a First In First Out (FIFO) basis.

Allocating the upstream bandwidth in the preferred embodiment is significantly more complicated. Each EUN sends requests to the Hub for specific VCs, which are carried with other upstream cells or vital to the contention mechanism. The Hub takes these requests and converts them into pseudo cells, which are input to an ATM scheduler. The Hub also predicts the arrival of CBR traffic, and generates pseudo cells for them automatically. To make each assignment, the Hub examines the virtual cell selected by the scheduler and grants an assignment to the corresponding VC at the appropriate EUN. Normally, requests are carried with other traffic in the request fields of upstream MAC cells. However, a contention mechanism is provided to significantly reduce latency when an otherwise idle EUN receives cells to transmit upstream.

The sign-on procedure of the preferred embodiment is used by an EUN to establish initial ranging and power adjustments and establish a MAC level connection with the Hub and is a variation of the standard ranging process as described in [Survey of Ranging and Calibration Algorithms, KA]. Following sign-on, the DLL performs authentication of the newly connected EUN and VCs. A standard sign-off procedure is provided to allow the Hub or a local operator to gracefully terminate an EUN's connection. A mechanism for detecting connection loss due to extreme RF conditions and algorithms to automatically reestablish the connection is provided.

It will be readily apparent to one skilled in the art that other various modifications may be made to the preferred embodiment without departing from the spirit and scope of the invention as defined by the appended claims.

We claim:

1. A method of integrating a scheduling algorithm in a wireless network shared by a plurality of users comprising the step of:
   a. generating one or more contention slots;
   b. allocating a first number of contention slots according to a request and grant mode, wherein the first number is determined by a number of user access requests, further wherein each one of the number of user access requests corresponds to a different one of the first number of contention slots;
   c. allocating a second number of contention slots according to a contention mode;
   d. prioritizing the first number of contention slots and the second number of contention slots; and
   e. dynamically adjusting the first number of contention slots according to a change in the number of users requesting access, wherein if multiple new user access requests cause a collision, then a number of additional contention slots are generated and allocated according to the request and grant mode.

2. The method of claim 1 wherein at least one contention slot is allocated according to the contention mode at all times.

3. The method of claim 1 wherein a percentage value is assigned to each of the request and grant mode and the contention mode.

4. The method of claim 3 wherein the sum of the percentage values is 100%.

5. The method of claim 3 wherein the percentage value for each mode present in the wireless network is a dynamically changing value.

6. The method of claim 1 wherein each of the generated one or more contention slots provides access to a weighted fair queue.

7. The method of claim 6 wherein two new contention slots are generated, allocated according to the request and grant mode, and placed in the weighted fair queue when a collision occurs between two users.

8. The method of claim 7 wherein a starting request is placed in the weighted fair queue when all contention is resolved.

9. The method of claim 6 further comprising utilizing the weighted fair queue to adjust the rate of generating the one or more contention slots automatically.

10. The method of claim 9 wherein the rate of generating the one or more contention slots increases when the wireless network is lightly loaded.

11. The method of claim 9 wherein the rate of generating the one or more contention slots decreases when the wireless network is heavily loaded.

12. The method of claim 1 wherein the second number of contention slots is a fixed, predetermined number.

13. The method of claim 1 wherein the first number of contention slots is prioritized ahead of the second number of contention slots.

14. The method of claim 1 wherein new user access requests utilize one of the second number of contention slots allocated according to the contention mode.

15. The method of claim 14 wherein that the number of additional contention slots corresponds to at least a number of the multiple user access requests causing the collision, thereby increasing the first number of contention slots by the number of additional contention slots.

16. The method of claim 1 wherein each of the first number of contention slots is associated with a unique user making a user access request.

17. The method of claim 16 wherein if the unique user does not continue to make user access requests, the contention slot associated with the unique user is removed, thereby reducing the first number of contention slots.

18. An apparatus for integrating a scheduling algorithm in a wireless network shared by a plurality of users comprising:
   a. means for generating one or more contention slots;
   b. means for allocating a first number of contention slots according to a request and grant mode, wherein the first number is determined by a number of user access requests, further wherein each one of the number of user access requests corresponds to a different one of the first number of contention slots;
   c. means for allocating a second number of contention slots according to a contention mode;
   d. means for prioritizing the first number of contention slots and the second number of contention slots; and
   e. means for dynamically adjusting the first number of contention slots according to a change in the number of users requesting access, wherein if multiple new user access requests cause a collision, then a number of additional contention slots are generated and allocated according to the request and grant mode.

19. The apparatus of claim 18 wherein at least one contention slot is allocated according to the contention mode at all times.

20. The apparatus of claim 18 wherein a percentage value is assigned to each of the request and grant mode and the contention mode.

21. The apparatus of claim 20 wherein the sum of the percentage values is 100%.

22. The apparatus of claim 20 wherein the percentage value for each mode present in the wireless network is a dynamically changing value.

23. The apparatus of claim 18 wherein each of the generated one or more contention slots provides access to a weighted fair queue.

24. The apparatus of claim 23 wherein two new contention slots are generated, allocated according to the request and grant mode, and placed in the weighted fair queue when a collision occurs between two users.

25. The apparatus of claim 24 wherein a starting request is placed in the weighted fair queue when all contention is resolved.

26. The apparatus of claim 23 further comprising means for utilizing the weighted fair queue to adjust the rate of generating the one or more contention slots automatically.

27. The apparatus of claim 26 wherein the rate of generating the one or more contention slots increases when the wireless network is lightly loaded.

28. The apparatus of claim 26 wherein the rate of generating the one or more contention slots decreases when the wireless network is heavily loaded.

29. The apparatus of claim 18 wherein the second number of contention slots is a fixed, predetermined number.

30. The apparatus of claim 18 wherein the first number of contention slots is prioritized ahead of the second number of contention slots.

31. The apparatus of claim 18 wherein new user access requests utilize one of the second number of contention slots allocated according to the contention mode.

32. The apparatus of claim 31 wherein the number of additional contention slots corresponds to at least a number of the multiple user access requests causing the collision, thereby increasing the first number of contention slots by the number of additional contention slots.

33. The apparatus of claim 18 wherein each of the first number of contention slots is associated with a unique user making a user access request.

34. The apparatus of claim 33 wherein if the unique user does not continue to make user access requests, the contention slot associated with the unique user is removed, thereby reducing the first number of contention slots.

35. An apparatus for integrating a scheduling algorithm in a wireless network channel shared by a plurality of users comprising:
   a. a hub for transmitting and receiving wireless network signals such that the hub may receive requests and assign portions of a communication bandwidth;
   b. a plurality of end user nodes for transmitting and receiving wireless network signals such that a plurality of users may request or be granted a portion of the communication bandwidth; and
   c. a weighted fair queue for utilizing an adaptive contention scheduling scheme to generate one or more contention slots, to allocate a first number of contention slots according to a request and grant mode, wherein the first number is determined by a number of user access requests, each one of the number of user access requests corresponds to a different one of the first number of contention slots, to allocate a second number of contention slots according to a contention mode, to prioritize the first number of contention slots and the second number of contention slots, and to dynamically adjusting the first number of contention slots according to a change in the number of users requesting access, wherein if multiple new user access requests cause a collision, then a number of additional contention slots are generated and allocated according to the request and grant mode.

36. The apparatus of claim 35 wherein at least one contention slot is allocated according to the contention mode at all times.

37. The apparatus of claim 35 wherein a percentage value is assigned to each of the request and grant mode and the contention mode.

38. The apparatus of claim 37 wherein the sum of the percentage values is 100%.

39. The apparatus of claim 37 wherein the percentage value for each mode present in the wireless network is a dynamically changing value.

40. The apparatus of claim 35 wherein each of the generated one or more contention slots provides access to the weighted fair queue.

41. The apparatus of claim 40 wherein two new contention slots are generated, allocated according to the request and grant mode, and placed in the weighted fair queue when a collision occurs between two users.

42. The apparatus of claim 41 wherein a starting request is placed in the weighted fair queue when all contention is resolved.

43. The apparatus of claim 40 wherein the weighted fair queue adjusts the rate of generating the one or more contention slots automatically.

44. The apparatus of claim 43 wherein the rate of generating the one or more contention slots increases when the wireless network is lightly loaded.

45. The apparatus of claim 43 wherein the rate of generating the one or more contention slots decreases when the wireless network is heavily loaded.

46. The apparatus of claim 35 wherein the second number of contention slots is a fixed, predetermined number.

47. The apparatus of claim 35 wherein the first number of contention slots is prioritized ahead of the second number of contention slots.

48. The apparatus of claim 35 wherein new user access requests utilize one of the second number of contention slots allocated according to the contention mode.

49. The apparatus of claim 48 wherein the number of additional contention slots corresponds to at least a number of the multiple user access requests causing the collision, thereby increasing the first number of contention slots by the number of additional contention slots.

50. The apparatus of claim 35 wherein each of the first number of contention slots is associated with a unique user making a user access request.

51. The apparatus of claim 50 wherein if the unique user does not continue to make user access requests, the contention slot associated with the unique user is removed, thereby reducing the first number of contention slots.

52. The apparatus of claim 35 wherein the contention slots are prioritized according to a quality of service standard.

* * * * *

UNITED STATES PATENT AND TRADEMARK OFFICE
CERTIFICATE OF CORRECTION

PATENT NO. : 7,170,904 B1
APPLICATION NO. : 09/649265
DATED : January 30, 2007
INVENTOR(S) : Chih-Yuan Chang et al.

It is certified that error appears in the above-identified patent and that said Letters Patent is hereby corrected as shown below:

ON THE TITLE PAGE and Column 1,

At section (54), please insert --AN-- at the beginning of the title.

Title page, item [56] under U.S. PATENT DOCUMENTS, please add
--6,240,083 B1 5/2001 Wright et al.--

Signed and Sealed this

Tenth Day of April, 2007

JON W. DUDAS
*Director of the United States Patent and Trademark Office*